Patented July 25, 1933

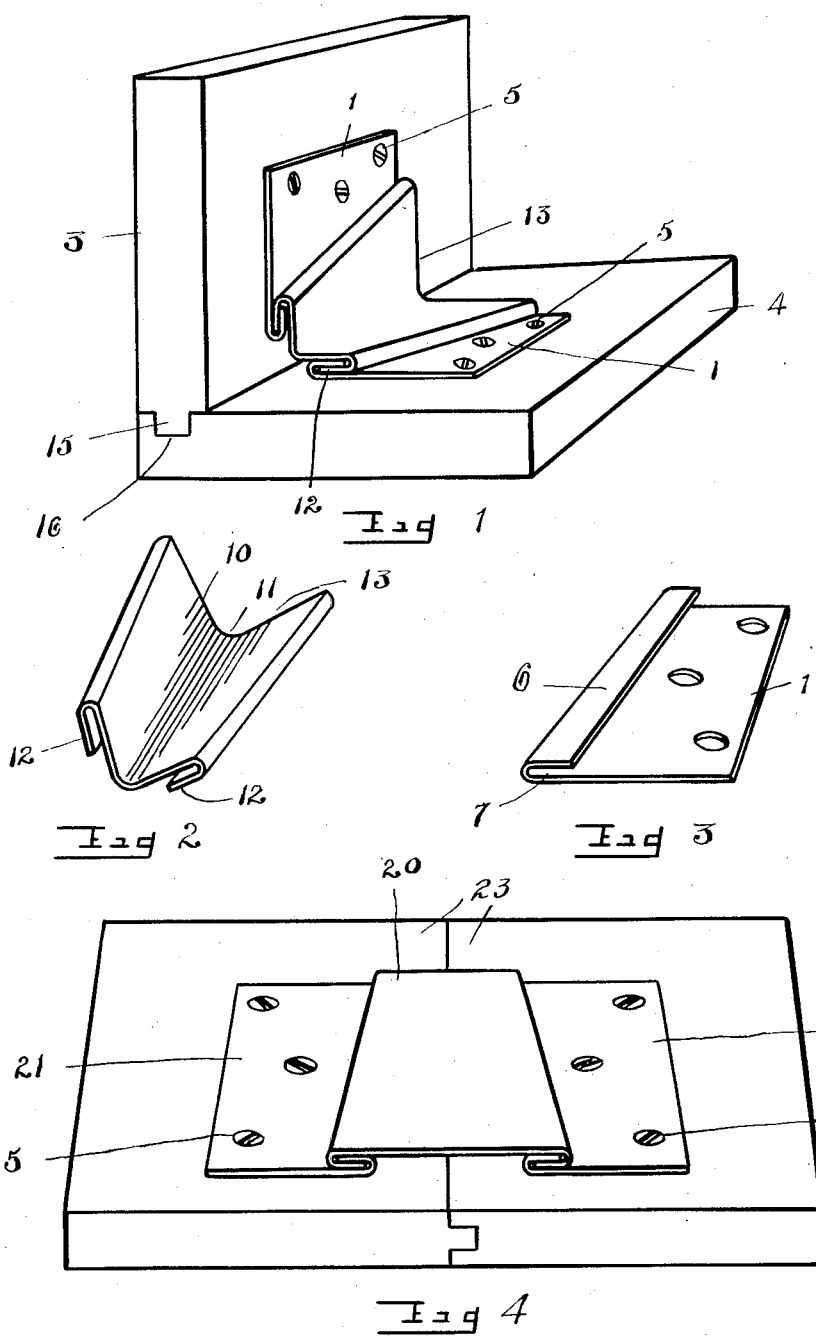

1,919,780

UNITED STATES PATENT OFFICE

ROSWELL LEE FAIRBANK, OF UTICA, NEW YORK, ASSIGNOR OF ONE-HALF TO PHILIP RAHN, OF WHITESBORO, NEW YORK

COUPLING

Application filed May 1, 1931. Serial No. 534,377.

My invention relates to a coupling and I declare the following to be a full, clear, concise and exact description thereof sufficient to enable anyone skilled in the art to which it appertains to make and use the same, reference being had to the accompanying drawing in which like parts refer to like characters throughout the specification.

The object of the invention is to provide a device that will be of simple construction and easy of manipulation to unite and hold together parts of the structure that are to be united.

The device will be found particularly useful in all take-down and knock-down structures, especially in construction of storm houses, knockdown furniture and temporary fixtures of any kind. Furthermore, it can be applied to advantage in attaching roofs to storm houses or like structures.

The object will be understood by referring to the drawing in which:

Fig. 1 is a perspective view of the device showing it in connection with corner pieces that are to be united.

Fig. 2 is a detailed view showing a perspective of one of the members of the corner piece.

Fig. 3 is a detailed view showing a perspective of another of the coner pieces employed.

Fig. 4 is a view of a modification showing a perspective thereof.

Referring more particularly to the drawing, the device consists of two members 1, 1 which are more or less permanently attached to the respective corner pieces 3 and 4 that are to be united. Each of the members 1, 1 has apertures for the projection of screws 5, whereby to secure them permanently in position to their respective corner pieces 3 and 4. Furthermore, each of the members 1, 1 is bent back upon itself as at 6 to provide a locking groove 7. The bent portion 6 is formed on a bevel for a purpose hereinafter stated.

Member 10 is adapted to cooperate with the members 1, 1 whereby to lock the corner pieces 3 and 4 in position. To this end, member 10 is formed with an angle therein at 11. Its ends are bent over upon itself as at 12, 12 to form locking grooves that permit the projection of the complimentary bent over portions 6, 6 of members 1, 1. Moreover, the bent over portions 12 are formed on a bevel to correspond with the bevel of the bent over portions 6, 6 of members 1, 1.

The parts 3 and 4 which are to be held in given relation to one another are usually provided with a tongue 15 and groove 16, whereby to interfit.

If it is desired to use the coupling on a storm shed, parts 1, 1 are mounted to corner portions 3 and 4 thereof by screws 5 in the same plane and in such a manner that their beveled portions recede from each other. When parts 3 and 4 are placed in juxtaposition with the tongue 15 of part 3 fitting into groove 16 of part 4, members 1, 1 will be disposed in the same vertical plane. Member 10 is mounted then by slipping the same upon members 1, 1 with bent over portions 12, 12 engaging the complementary grooves made by said bent over portions 6, 6 of members 1, 1. Parts 1, 1 and 10 are so arranged that when part 10 is placed in position its wider portion 13 will be lowermost whereby to use gravity to prevent its slipping off.

When taking down the storm house or other structure, member 10 can be pushed upward or in the direction of their widest part to free part 10 from parts 1, 1.

Fig. 4 shows a modification. In this structure member 20 which cooperates with members 21, 21 are intended to hold parts 23, 23 together when said parts 23, 23 are in the same plane. To this end member 20 will be made flat and without the angle as shown in Fig. 2.

Having thus described my invention what I claim as new and desire to secure by Letters Patent is as follows:

1. In a coupling for holding parts together, members having portions thereof bent parallel to form grooves and adapted to be attached to the parts to be united, another member having portions bent parallel to form grooves, whereby said second named member will co-operate with said first named member to hold said parts in a detachable manner and said second named member being formed with an angle, whereby to aid in joining corner pieces together.

2. In a coupling, members having portions thereof bent parallel to form grooves, said members adapted to be attached to corner pieces at an angle to each other, another member having parts thereof bent parallel for co-operating with said first named members, whereby to hold said parts in a detachable manner and one of said members being bent at an angle whereby to unite said corner pieces.

3. In a coupling, members having portions thereof bent parallel to form grooves, said members adapted to be attached to corner pieces to be united, another member having parts thereof bent parallel for engaging said first named members, whereby to hold said parts united in a detachable manner, said parts being formed on a bevel, whereby to prevent displacement, and one of said members being bent at an angle, whereby to unite said corper pieces.

4. In a coupling, members having interlocking grooves formed thereon, another member having complementary projections formed thereon, whereby to engage said first named members and to hold said parts in a detachable manner, said parts being beveled to prevent accidental displacement and one of said parts being formed with an angle whereby to engage said first named members from different angles.

ROSWELL LEE FAIRBANK.